July 10, 1951     S. L. FRANK     2,560,099
LIQUID TIGHT INDICATOR LIGHT
Filed Jan. 14, 1949
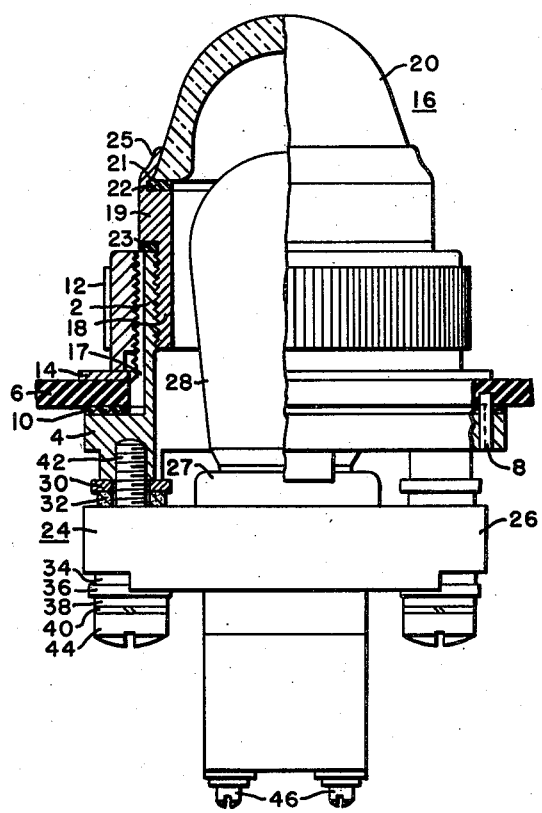
WITNESSES:
H. F. Susser.
Albert C. Shapira
INVENTOR
Stanley L. Frank.
BY Ralph H. Swingle
ATTORNEY Patented July 10, 1951

2,560,099

UNITED STATES PATENT OFFICE 2,560,099

LIQUID TIGHT INDICATOR LIGHT

Stanley L. Frank, Beaver, Pa., assignor to Westinghouse Electric Corporation, East Pittsburgh, Pa., a corporation of Pennsylvania Application January 14, 1949, Serial No. 70,893

13 Claims. (Cl. 177—329)

This invention relates generally to indicator light assemblies, and more particularly to such assemblies as are commonly employed in electrical circuits for indicating the existence of certain circuit conditions.

Indicated light assemblies are often used in locations where a liquid, such as the oil used as a lubricant or coolant for machine tools may be splashed against the assemblies, and one object of this invention is to provide a novel indicator light assembly which is liquid-proof.

A more particular object of this invention is to provide a novel liquid-proof mounting for an indicator light in a panel with the circuit connections being mounted at the back of the panel.

Another object of this invention is to provide in a novel liquid-proof indicator light mounting, means enabling ready access to the indicator lamp for easy changing of the lamp.

These and other objects of this invention will become more apparent upon consideration of the following detailed description of a preferred embodiment thereof, when taken in connection with the attached drawing, which illustrates a side elevation view of an indicator light assembly constructed and mounted on a panel in accordance with the invention, and shown partly in section.

The indicator light assembly shown in the attached drawing is shown as being assembled with a panel 6 in a manner as hereinafter described. The indicator light assembly includes a sleeve 2 preferably of a cast metal, such as, for example, a zinc base die-casting, and having a flange 4 at the inner end thereof adapted to engage the inner side of supporting panel 6. Preferably, flange 4 of sleeve 2 has a positioning pin 8 secured thereto which is adapted to be received in a recess at a predetermined position on the inner side of panel 6. A sealing disc 10 of a moisture-proof compressible sealing material, such as rubber, or preferably oil resistant synthetic rubber, such as polychloroprene or the like, is interposed between flange 4 of the sleeve and the inner surface of the supporting panel 6. The outer end of the outer side of sleeve 2 is threaded for threadedly receiving a clamping ring 12 which is adapted to secure the sleeve to panel 6 when the clamping ring is drawn up tightly. If desired an indicator washer 14 may be provided between clamping ring 12 and supporting panel 6, and this washer may carry suitable indicia for proper identification of the pilot lamp assembly, and for interpreting the lighted and non-lighted condition of the lamp. Indicator washer 14 preferably is provided with key projections (not shown) adapted to be received in longitudinal external grooves 17 in sleeve 2 to properly position washer 14 on the sleeve and prevent relative angular movement.

The inner side of the outer end of sleeve 2 is threaded for threadedly engaging lens unit 16. Lens unit 16 comprises a sleeve 18, which may be made of steel, brass or other metal of moderate ductility to permit the spinning or pressing operation hereinafter described, or preferably a cast metal such, for example, as a brass die-casting, and has a flange portion 19 at the outer end thereof which engages the outer end of sleeve 2. Interposed between the outer end of sleeve 2 and flange portion 19 is a sealing disc 23 of a liquid-proof compressible sealing material, such as rubber, or preferably oil resistant synthetic rubber, such as polychloroprene, or the like. Flange portion 19 of sleeve 18 has an inner shoulder 21 which is adapted to receive a lens 20 which is made preferably of glass, or any other light transmitting material. Bezel lip 25 of lens sleeve 18 is made in a vertical position (not shown). During assembly of sleeve 18, lens 20 is positioned on shoulder 21 and then bezel lip 25 is spun or machine pressed around the lower outside part of lens 20 into intimate contact therewith. A compressible moisture-proof gasket 22, which may be made of rubber, or oil resistant synthetic rubber, such as polychloroprene, or the like, but which is preferably made of a compressed polychloroprene asbestos composition sheet material, especially useful as a high temperature gasket material, is interposed between shoulder 21 and lens 20 so that when bezel lip 25 is spun or pressed around lens 20, gasket 22 is compressed.

Lamp unit 24 is attached to flange 4 of sleeve 2 by means of screws such as fillister-head screws 42. Lamp unit 24 comprises a lamp base 26 which may be made of porcelain or any other suitable insulating material and included integrally therewith is a socket 27 for removably receiving a lamp 28 therein in any well-known manner. Lamp unit 24 has terminals 46 at the inner end thereof to permit connection to a suitable power source. Interposed between lamp base 26 and flange 4 on each of the screws 42 are steel washer 30 and leather washer 32. Interposed between lamp base 26 and the head 44 of fillister-head screws 42, are leather washers 34 and 38, steel washer 36 and a spring type shake-proof washer 40.

Lamp 28 is readily made accessible for replacement, by screwing out lens unit 16 from sleeve 2.

The indicator light assembly described above is thus adapted to be secured to a supporting panel 6 or the like, in a manner to prevent the passage of liquids from one side of the panel to the other, onto the receptacle 26 and its terminals 46 and to prevent liquids from getting on the lamp 28. All of the openings through which liquids might pass have been sealed against such passage by the employment of compressible liquid-proof washers 10, 22 and 23.

Having described a preferred embodiment of this invention in accordance with the patent statutes, it is desired that the invention be not limited to these particular devices inasmuch as it will be apparent that many changes and modifications may be made therein without departing from the broad spirit and scope of this invention. Accordingly it is desired that the invention be interpreted as broadly as possible and that it be limited only as required by the prior art.

I claim as my invention:

1. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, and a lens member detachably secured to said sleeve member and having a flange adapted to engage the outer end of said sleeve member when said lens member is secured to said sleeve member.

2. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, and a lens member detachably secured to the inside of said sleeve member and having a flange adapted to engage the outer end of said sleeve member when said lens member is secured to said sleeve member.

3. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, and a tubular lens member threadedly secured to said sleeve member and having a shoulder adapted to engage the outer end of said sleeve member when said lens member is drawn into said sleeve member.

4. Indicator light structure adapted to be mounted in an opening through a support, including a sleeve member adapted to extend through said support opening and having a flange at one end adapted to engage the inner side of said support, a clamping ring threaded on the outside of said sleeve member to engage the outer side of said support when drawn tight to secure said sleeve member in said opening, a tubular lens member threadedly secured to said sleeve member, shoulder means on said sleeve member and lens member engageable when said lens member is drawn tight in said sleeve member, and a compressible moisture proof gasket positioned between said sleeve and lens members.

5. Indicator light structure adapted to be mounted in an opening through a support, including a sleeve member adapted to extend through said support opening and having a flange at one end adapted to engage the inner side of said support, a clamping ring threaded on the outside of said sleeve member to engage the outer side of said support when drawn tight to secure said sleeve member in said opening, a lens member detachably secured to the outer end of said sleeve member, a lamp assembly comprising a base and a lamp mounted therein, and means for securing said lamp assembly to the underside of the flange of said sleeve member.

6. Indicator light structure adapted to be mounted in an opening through a support, including a sleeve member adapted to extend through said support opening and having a flange at one end adapted to engage the inner side of said support, a clamping ring threaded on the outside of said sleeve member to engage the outer side of said support when drawn tight to secure said sleeve member in said opening, a lens member detachably secured to the outer end of said sleeve member, a lamp assembly comprising a base and a lamp mounted therein, and means for securing said lamp assembly to the underside of the flange of said sleeve member at a position such that at least a part of said lamp assembly extends into said sleeve.

7. Indicator light structure adapted to be mounted in an opening through a support including a sleeve member adapted to extend through said support opening and having a flange at one end adapted to engage the inner side of said support, a clamping ring threaded on the outside of said sleeve member to engage the outer side of said support when drawn tight to secure said sleeve member in said opening, and a lens member detachably secured to said sleeve member, said lens member having a sleeve portion, and a flange portion adjacent one end thereof adapted to engage the outer end of said sleeve member when the sleeve portion of said lens member is secured in telescoping relation to said sleeve member and said lens member, further including light transmitting means attached to and covering the outer end of said sleeve portion.

8. Indicator light structure adapted to be mounted in an opening through a support including a sleeve member adapted to extend through said support opening and having a flange at one end adapted to engage the inner side of said support, a clamping ring threaded on the outside of said sleeve member to engage the outer side of said support when drawn tight to secure said sleeve member in said opening, a lens member detachably secured to said sleeve member, said lens member having a sleeve portion, and a flange portion adjacent one end thereof adapted to engage the outer end of said sleeve member when the sleeve portion of said lens member is secured in telescoping relation to said sleeve member, said lens member further including light transmitting means attached to and covering the outer end of said lens member, a lamp assembly comprising a base and a lamp mounted therein, and means for securing said lamp assembly to the flange of said sleeve member at a position such that at least part of said lamp assembly extends into said sleeve.

9. Indicator light structure adapted to be mounted in an opening through a support including a sleeve member adapted to extend through said support opening and having a flange at one end adapted to engage the inner side of said support, a compressible moisture-proof gasket positioned on said sleeve between said flange and said support, a clamping ring threaded on the outside of said sleeve to engage the outer side of said support when drawn tight to secure said sleeve member in said opening, a lens member detachably mounted to said sleeve member, said lens member having a sleeve portion, and a flange portion adjacent one end thereof adapted to engage the outer end of said sleeve member when said sleeve portion is secured in telescoping relation to said sleeve member, and a compressible moisture-proof gasket positioned between said flange portion and the outer end of said sleeve member.

10. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, a lens member detachably secured to said sleeve member and having a flange portion adapted to engage the outer end of said sleeve member when said lens member is secured to said sleeve member, said lens member including a sleeve portion, a lens portion, and a compressible moisture-proof gasket positioned therebetween, said sleeve portion supporting said lens portion on an annular shoulder on the inner side of said sleeve portion, and bezel means engaging said lens portion to place said moisture-proof gasket in compression.

11. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, a lens member threaded on the inside of said sleeve member, said lens member including a flange portion adapted to engage the outer end of said sleeve member when said lens member is drawn tight in said sleeve member and a light transmitting domed lens, said flange portion supporting said lens, and a lamp assembly, attached to the flange of said sleeve member, comprising a base portion and a lamp portion, said base portion extending at least partially into said sleeve member and said lamp portion extending at least partially into the space defined by the inner side of said domed lens.

12. Indicator light structure adapted to be mounted in an opening through a support including a sleeve member adapted to extend through said support opening and having a flange at one end adapted to engage the inner side of said support, a first compressible moisture-proof gasket positioned on said sleeve between said flange and said support, a clamping ring threaded on the outside of said sleeve to engage the outer side of said support when drawn tight to secure said sleeve member in said opening, a lens member detachably mounted to the inside of said sleeve member, said lens member having a sleeve portion, a flange portion adjacent one end thereof adapted to engage the outer end of said sleeve member when said sleeve portion is secured in telescoping relation to said sleeve member, and a lens portion, a second compressible moisture-proof gasket positioned between said sleeve portion and lens portion, said sleeve portion supporting said lens portion on an annular shoulder on the inner side of said sleeve portion, bezel means at the outer end of said sleeve portion engaging said lens portion to place said second moisture-proof gasket in compression, and a third compressible moisture-proof gasket positioned between said flange portion of said lens member and the outer end of said sleeve member.

13. Indicator light structure adapted to be mounted in an opening through a support, including a sleeve member adapted to extend through said support opening and having a flange at one end adapted to engage the inner side of said support, a clamping ring threaded on the outside of said sleeve to engage the outer side of said support when drawn tight to secure said sleeve member in said opening, a lens member detachably secured to said sleeve member and having a flange adapted to engage the outer end of said sleeve member when said lens member is secured to said sleeve member, and a compressible moisture-proof gasket positioned between the flange of said lens member and the outer end of said sleeve member.

STANLEY L. FRANK.

REFERENCES CITED

The following references are of record in the file of this patent:

UNITED STATES PATENTS

| Number | Name | Date |
|---|---|---|
| 1,858,994 | Kirkland | May 17, 1932 |
| 2,207,507 | Douglass | July 9, 1940 |
| 2,424,574 | Marco | July 27, 1947 |
| 2,424,575 | Aves | July 27, 1947 |